US012681290B2

(12) United States Patent　　(10) Patent No.:　US 12,681,290 B2
Lin et al.　　　　　　　　　　　　(45) Date of Patent:　　　Jul. 14, 2026

(54) VARIABLE OPTICAL ATTENUATOR WITH SHUTTER TYPE MEMS

(71) Applicant: II-VI Photonics, Inc., Fuzhou (CN)

(72) Inventors: Jiangming Lin, Fuzhou (CN); Baozhong Zheng, Fuzhou (CN); Yunbing Xu, Fuzhou (CN); Yang Li, Fuzhou (CN)

(73) Assignee: II-VI Photonics, Inc., Fuzhou (CN)

( * ) Notice: Subject to any disclaimer, the term of this patent is extended or adjusted under 35 U.S.C. 154(b) by 309 days.

(21) Appl. No.: 18/404,097

(22) Filed: Jan. 4, 2024

(65) Prior Publication Data

US 2025/0172796 A1　　May 29, 2025

(30) Foreign Application Priority Data

Nov. 29, 2023　　(CN) .......................... 202311619249.6

(51) Int. Cl.
*G02B 26/02*　　　　(2006.01)
*G02B 26/08*　　　　(2006.01)

(52) U.S. Cl.
CPC ....... *G02B 26/023* (2013.01); *G02B 26/0816* (2013.01)

(58) Field of Classification Search
CPC ... G02B 26/023; G02B 26/0816; G02B 6/266
USPC ......................................................... 359/230
See application file for complete search history.

(56) References Cited

U.S. PATENT DOCUMENTS

| | | | |
|---|---|---|---|
| 6,934,069 B2 * | 8/2005 | Moon ................ | G02B 6/29394 |
| | | | 359/290 |
| 9,201,286 B2 * | 12/2015 | Mao .................... | G02B 17/0864 |
| 10,749,598 B2 | 8/2020 | Sakurai | |
| 2002/0031324 A1 * | 3/2002 | Cao ......................... | G02B 6/352 |
| | | | 385/140 |
| 2003/0174939 A1 * | 9/2003 | Moon ................ | G02B 26/0833 |
| | | | 385/27 |
| 2005/0100277 A1 * | 5/2005 | Frisken .............. | G02B 6/29311 |
| | | | 385/37 |
| 2009/0323167 A1 * | 12/2009 | Akashi ................... | G02B 6/266 |
| | | | 359/290 |
| 2015/0185583 A1 * | 7/2015 | Mao ...................... | G02F 1/0136 |
| | | | 349/196 |
| 2016/0286288 A1 * | 9/2016 | Suzuki ............... | H04Q 11/0005 |
| 2018/0210151 A1 * | 7/2018 | Garrett .................. | G01J 1/4228 |

* cited by examiner

*Primary Examiner* — William R Alexander
(74) *Attorney, Agent, or Firm* — The Webb Law Firm

(57)　　　　　　　ABSTRACT

In a variable optical attenuator (VOA) and a method of variably optically attenuating a light beam, a input lens receives an input light beam and an output lens outputs an output light beam. A mirror reflects the input light beam as the output light beam. The mirror or a moveable element is movable in a manner to block, pass, and/or reflect at least a portion of the light included in the input light beam and the output light beam, whereupon the output light beam has reduced or increased brightness or intensity versus the input light beam.

11 Claims, 14 Drawing Sheets

VARIABLE OPTICAL ATTENUATOR WITH SHUTTER TYPE MEMS

CROSS-REFERENCE TO RELATED APPLICATION

This application claims priority to Chinese Patent Application No. 202311619249.6 filed Nov. 29, 2023, the disclosure of which is hereby incorporated by reference in its entirety.

BACKGROUND

1) Field

The present disclosure relates to systems and methods for variable optical attenuation.

2) Background

A variable optical attenuator (VOA) is a device used in fiber optic communication systems to control the power level of an optical signal within an optical fiber. It is designed to attenuate or reduce the intensity of light passing through it, without significantly affecting other signal characteristics such as wavelength or data modulation. VOAs are used to manage signal power levels, optimize signal quality, and protect sensitive optical components in a network.

Components of a VOA prior to the present disclosure may include: first and second collimator lenses, an optical path conversion prism, a birefringent crystal, and a pair of liquid crystal elements, one of which includes a reflecting mirror (see U.S. Pat. No. 10,749,598 B2).

SUMMARY

Disclosed it a variable optical attenuator (VOA) comprising a lens means for receiving an input light beam and for outputting an output light beam; a reflector or mirror for reflecting the input light beam as the output light beam; and a moveable element that is movable, at least partially, into or out of a path of at least one of the input light beam and the output light beam between the lens means and the reflector or mirror for blocking at least a portion of the at least one of the input light beam and the output light beam.

Also disclosed is a method of variably optically attenuating a light beam comprising: (a) passing an input light beam through a first lens; (b) reflecting, by a reflector or mirror, at least a portion of the input light beam of step (a) as an output light beam; (c) positioning a moveable element at least partially in a path of at least one of the input light beam and the output light beam; and (d) outputting at least a portion of the output light beam through a second lens.

Also disclosed is a variable optical attenuator (VOA) comprising: a lens means for receiving an input light beam and for outputting an output light beam; and a reflector or mirror for reflecting the input light beam as the output light beam, wherein the reflector or mirror is movable, at least partially, into or out of a path of the input light beam.

Also disclosed is a method of variably optically attenuating a light beam comprising; (a) passing an input light beam through a first lens; (b) reflecting, by a reflector or mirror, at least a portion of the input light beam of step (a) as an output light beam; (c) moving the reflector or mirror at least partially into or out of a path of the input light beam; and (d) outputting at least a portion of the output light beam through a second lens.

Also disclosed is a variable optical attenuator (VOA) comprising: a lens means for receiving an input light beam and for outputting an output light beam; a rotatable mirror positioned and operative, when rotating, for reflecting the input light beam received from the lens means to different parts of an input face of a cylindrical lens which causes the input light beam received at the different parts of the input face of the cylindrical lens to be output as a plurality of parallel beams of light via an output face of the cylindrical lens; and a reflector positioned for reflecting at least a portion of the parallel beams of light output via the output face of the cylindrical lens back through the cylindrical lens to the rotatable mirror which reflects the light received from the cylindrical lens as the output light beam.

A shutter or block may be positioned between the output face of the cylindrical lens and the reflector. The shutter or block may positioned to pass the at least portion of the parallel beams of light to the reflector and to avoid or prevent another portion of the parallel beams of light output via the output face of the cylindrical lens from reaching the reflector.

Also disclosed is a method of variably optically attenuating a light beam comprising: (a) passing an input light beam through a first lens; (b) reflecting, by a rotating mirror, at least a portion of the input light beam of step (a) to a reflector via a cylindrical lens which separates the input light beam received at the different parts of an input face of the cylindrical lens into a plurality of parallel beams of light that are output via an output face of the cylindrical lens to the reflector; (c) reflecting, by the reflector, at least a portion of the parallel beams of light output via the output face of the cylindrical lens back through the cylindrical lens to the rotating mirror which reflects the light received from the cylindrical lens as the output light beam through a second lens.

The method may further include blocking, by a shutter or block, another portion of the plurality of parallel beams of light output via the output face of the cylindrical lens from reaching the reflector.

DETAILED DESCRIPTION

Figure 1A:
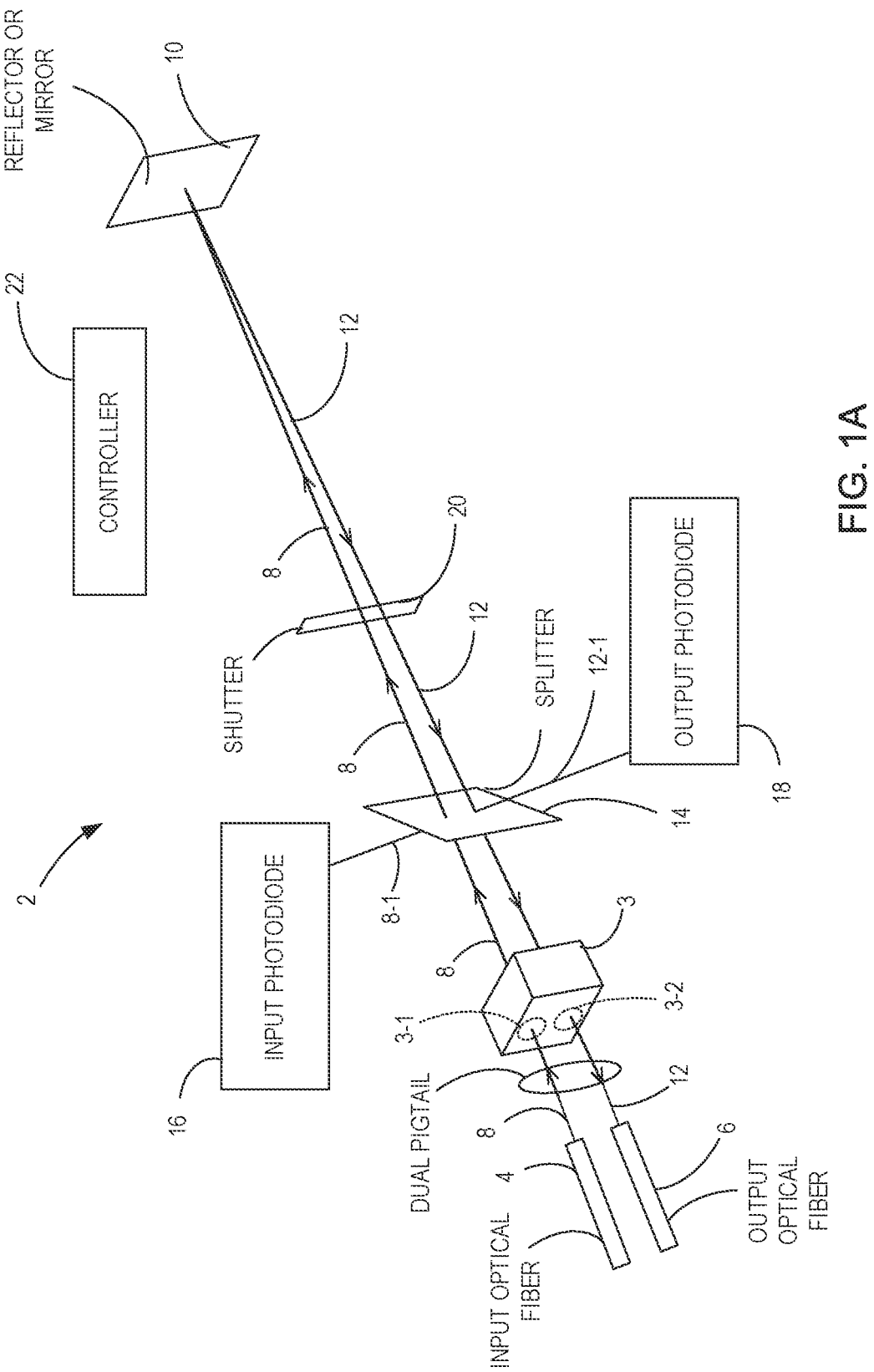
FIGS. 1A and 1B are perspective side and end views of an example VOA in accordance with the principles of the present disclosure including a lens means, a stationary reflector or mirror, and a moveable element or shutter that is movable into and out of the path of at least one of an input light beam and an output light beam.

As used herein, spatial or directional terms, such as "left", "right", "inner", "outer", "above", "below", and the like, relate to the disclosure as it is shown in the drawing figures. However, it is to be understood that the disclosure can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "approximately" or "about". Accordingly, unless indicated to the contrary, the numerical values set forth in the following specification and claims may vary depending upon the desired properties sought to be obtained by the present disclosure.

At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Herein, the terms "reflector" and "mirror" may be used interchangeably. The shapes of the rays or beams of light shown in the drawings are strictly for the purpose of this disclosure and are not to be construed in a limiting sense.

Various non-limiting examples will now be described with reference to the accompanying figures where like reference numbers correspond to like or functionally equivalent elements.

With reference to FIGS. 1A-1D, an example variable optical attenuator (VOA) 2 in accordance with the principles of the present disclosure comprises a lens means 3 optically coupled to input and output optical fibers 4 and 6, e.g., via a dual pigtail. In an example, the lens means 3 may comprise input and output lenses 3-1 and 3-2 (shown in phantom in FIG. 1A) optically coupled to the input and output optical fibers 4 and 6, respectively. The lens means 3 may comprise a lens array that includes the input and output lenses 3-1 and 3-2.

An input light beam 8 exiting the input optical fiber 4 may pass though the input lens 3-1 which focuses and passes the input light beam 8 toward a reflector or mirror 10. The input light beam 8 striking the surface of the reflector or mirror 10 may be reflected thereby as an output light beam 12 which passes through the output lens 3-2 of the lens means 3 which focuses and passes the output light beam 12 to the output optical fiber 6.

The VOA 2 may include an optional splitter 10 which may reflect portions 8-1 and 12-1 of the input and output light beams 8 and 12 to optional input and output photodiodes 16 and 18 for conversion into electrical signals having values related to the brightness's or intensities of the input and output light beams 8 and 12, respectively. These electrical signals may be provided to an optional controller 22 which may be programmed or configured to control the movement of a moveable shutter 20 in a manner described hereinafter.

The portions of the input and output light beams 8 and 12 impinging on the splitter 12 and not reflected by the splitter 12 to the input and output photodiodes 16 and 18 may pass through the splitter 14 toward the reflector or mirror 10 (for the input light beam 8) and the output lens 3-2 (for the output light beam 12).

The moveable shutter 20 may positioned or disposed between the lens means 3 or, if provided, the splitter 14 and the reflector or mirror 10. The shutter 20 may be movable manually or under the control of the optional controller 22 partially or completely into or out of a path of at least one of the input light beam 8 and the output light beam 12.

Figure 1B:
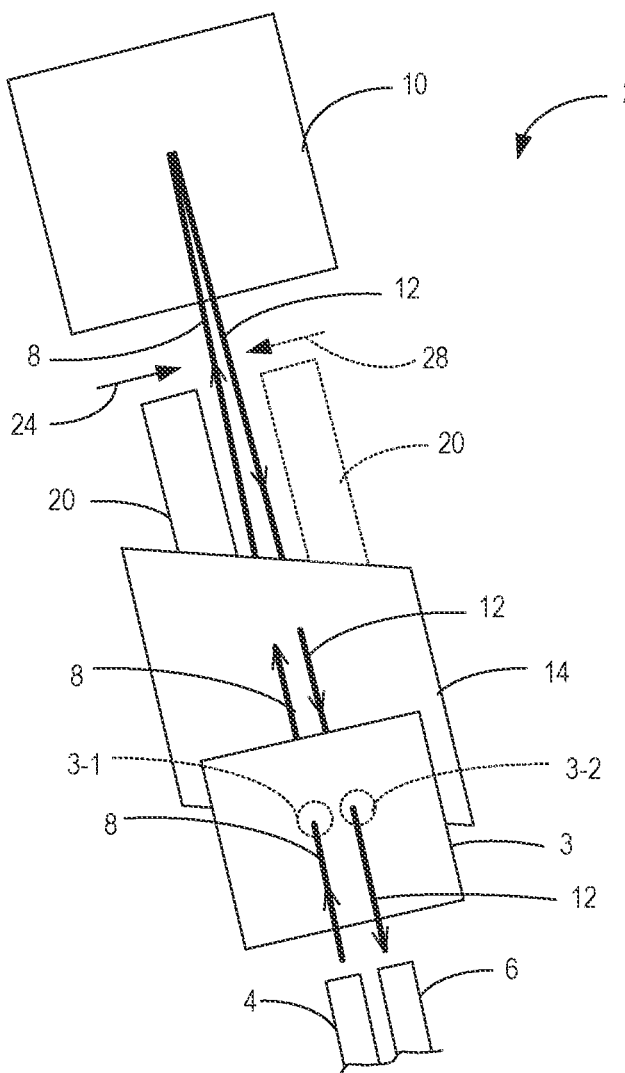

In an example starting from the state shown in FIG. 1B where the shutter 20 is disposed or positioned outside of the paths of the input and output light beams 8 and 12, the input light beam 8 received from the input optical fiber 4 is focused by the input lens 3-1 and is reflected by the reflector or mirror 10 as the output light beam 12 which is focused by the output lens 3-2 and provided to the output optical fiber 6.

Figure 1C:
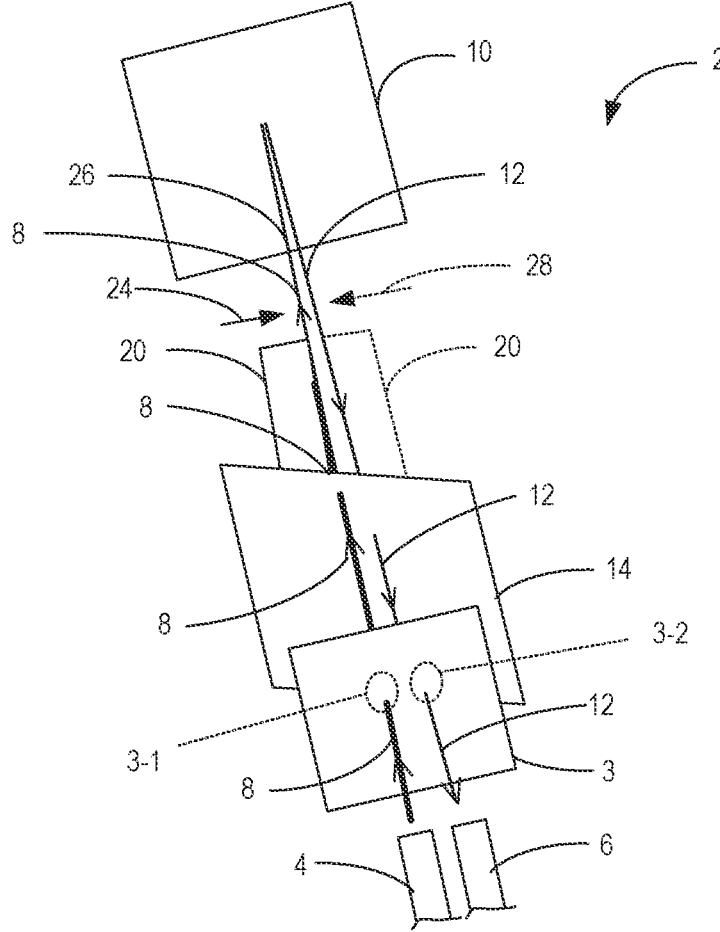
FIGS. 1C-1D are perspective end views of the example VOA shown in FIG. 1B showing the progressive movement of the moveable element or shutter into or out of the path of the at least one of the input light beam and the output light beam.

If it is determined, either manually (e.g., empirically) or via the optional controller 22 from the values of electrical signals output by one or both of the photodiodes 16 and 18, that the output light beam 12 has too much or too great of a brightness or intensity, the shutter 20 may be moved, in the direction of arrow 24, partially into the path of the input light beam 8 as shown in FIG. 1C. In response to this movement, the shutter 20 partially passes a portion 26 of the input light beam 8 to the reflector or mirror 10 and partially blocks the remainder of the input light beam 8, i.e., the shutter 20 partially blocks the input light beam 8 and passes the portion 26 of the input light beam 8 to the reflector or mirror 10.

For the purposes of illustration, in FIG. 1C the input light beam 8 prior to being partially blocked by the shutter 20 is shown by a heavier line weight (indicative of the greater brightness or intensity of the input light beam 8 impinging on the shutter 20) while the portion 26 of the input light beam 8 passed to the reflector or mirror 10 and, hence, the output light beam 12 are shown by lighter line weights (indicative of a reduced brightness or intensity of the portion 26 of the input light beam 8 passed to the reflector or mirror 10 and, hence, the output light beam 12). Herein, in all the figures, a heavier line weight may be used to indicate a greater brightness or intensity of a light beam and a lighter line weight may be used to indicate a lesser or reduced brightness or intensity of a light beam relative to the greater brightness or intensity indicated by a heavier line weight.

As can be seen, the brightness or intensity of the output light beam 12 may be controlled by selectively moving the shutter 20 as needed and/or desired to block as little or as much of the input light beam 8 to achieve a desired level of attenuation between the input and output light beams 8 and 12.

Figure 1D:
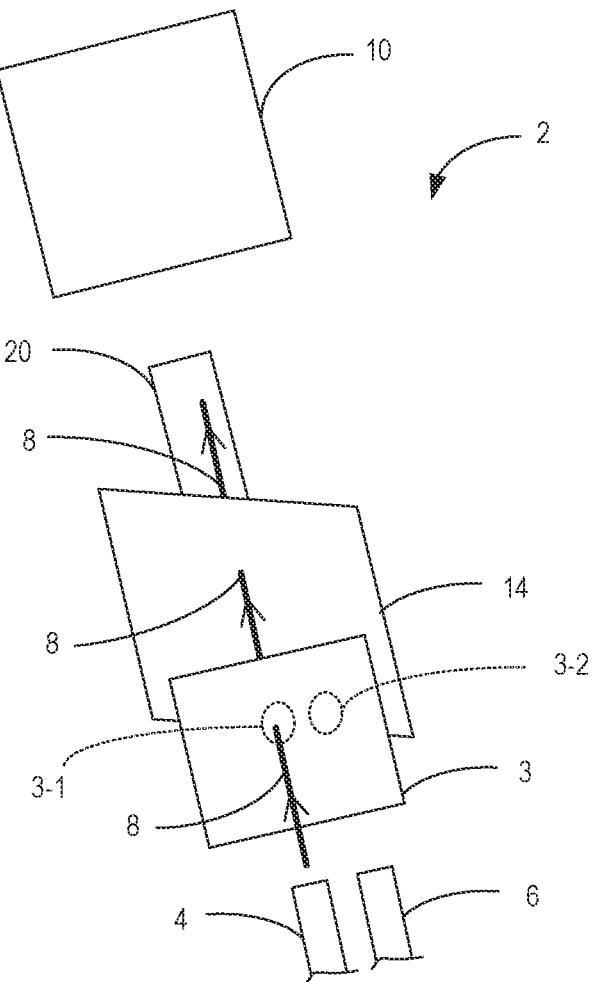

As shown in FIG. 1D, if desired, the shutter 20 may be moved entirely into the path of the input light beam 8, such that the VOA 2 achieves complete attenuation of the input light beam 8 whereupon there is no output light beam 12. Conversely, while not shown in FIGS. 1A-1D, the shutter 20 may be moved entirely out of the path of the input light beam 8, whereupon there is no attenuation of the input light beam 8 and the input light beam 8 and the output light beam 12 have the same brightness of intensity.

In FIGS. 1B-1D, the input and output photodiodes 16 and 18 and the optional controller 22 shown in FIG. 1A are omitted for simplicity. However, the example VOA shown in FIGS. 1A-1D may include the optional splitter 14, the optional input and output photodiodes 16 and 18, and the optional controller 22 or may exclude some or all of these elements as determined by the application or desired capabilities of the VOA. Accordingly, in the example VOA shown in FIGS. 1A-1D, the presence or absence of one or more of the optional splitter 14, the optional input and output photodiodes 16 and 18, and the optional controller 22 is not to be construed in a limiting sense.

In the example described above, the shutter 20, starting from a position on the left side of the input light beam 8, was moved rightward (in the direction of arrow 24) partially or completely into the path of the input light beam 8. In another example shown in FIGS. 1B-1C, the shutter 20 may be repositioned to a start positon (shown in phantom) on the right side of the output light beam 12 and may be moved leftward (in the direction of dashed arrow 28) partially or completely into the path of the output light beam 12 thereby reducing the brightness or intensity of the output light beam 12 (or blocking the output light beam 12) without first reducing the brightness or intensity of the input light beam 12.

In an example, the positon of the shutter 20 blocking all or part of the input light beam 8 or the output light beam 12 may be varied as desired to achieve a desired level of attenuation. For example, starting from a state where the shutter 20 (shown in solid lines in FIG. 1C) is partially blocking the input light beam 8, the shutter may be moved leftward to allow more of the input light beam 8 to pass and be reflected by the reflector or mirror 10 as the output light beam 12. Similarly, starting from a state where the shutter 20 (shown in dashed lines in FIG. 1C) is partially blocking the output light beam 12, the shutter may be moved rightward to allow more of the output light beam 12 to pass to the lens means 3.

The example VOAs discussed hereinafter may be described and/or illustrated as including the optional splitter 14 and excluding the optional input and output photodiodes 16 and 18 and the optional controller 22 shown in FIG. 1A. Depending on the application, however, each example VOA discussed hereinafter may include the optional splitter 14, the optional input and output photodiodes 16 and 18, and the optional controller 22 or may, for the purpose of simplicity, exclude some or all of these elements as determined by the application or desired capabilities of the VOA. Accordingly, in the example VOAs described and illustrated in the figures hereinafter, the presence or absence of one or more of the optional splitter 14, the optional input and output photodiodes 16 and 18, and/or the optional controller 22 is not to be construed in a limiting sense.

Figure 2A:
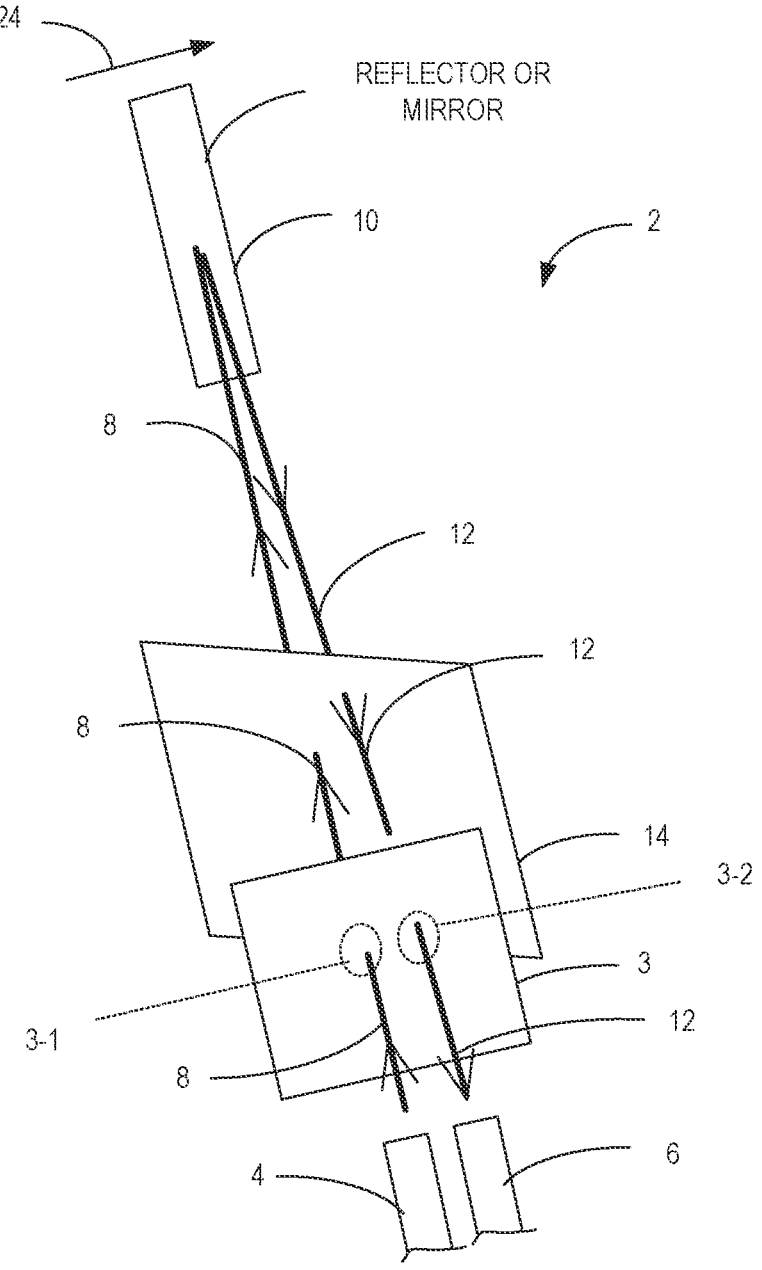
FIGS. 2A-2C are perspective end views of another example VOA in accordance with the principles of the present disclosure including a movable reflector or mirror that is movable into and out of the path of at least one of an input light beam and an output light beam.
Figure 2B:
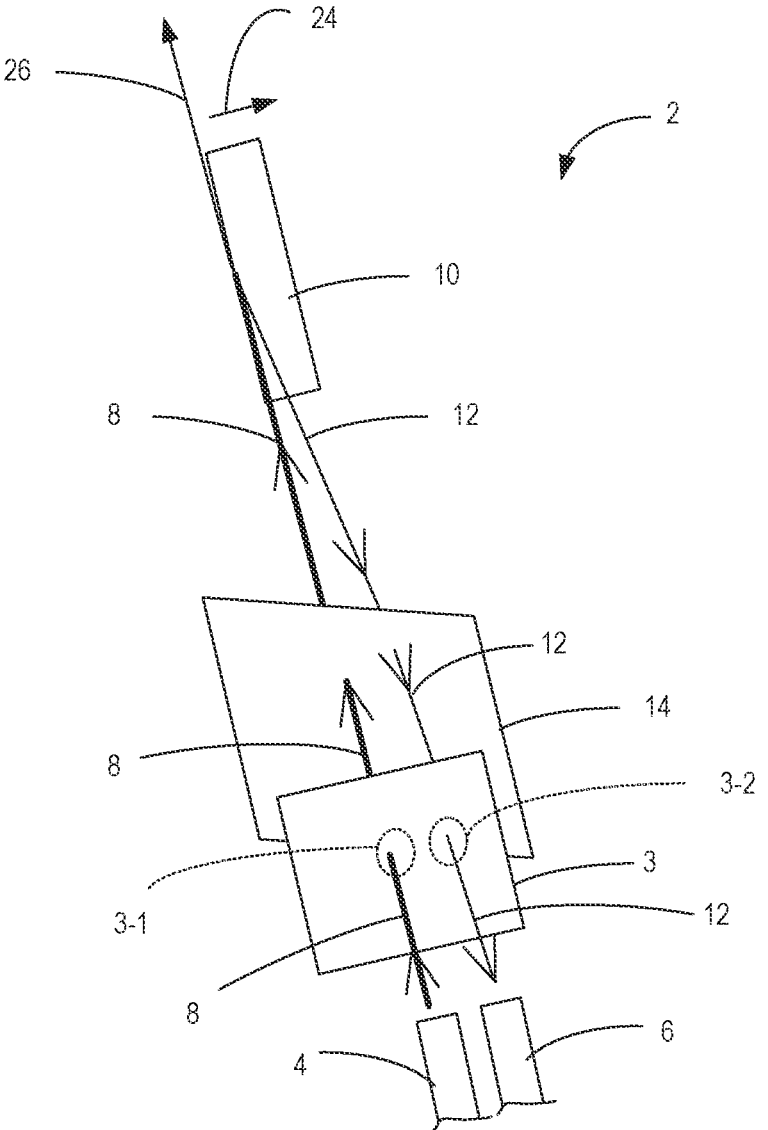
Figure 2C:
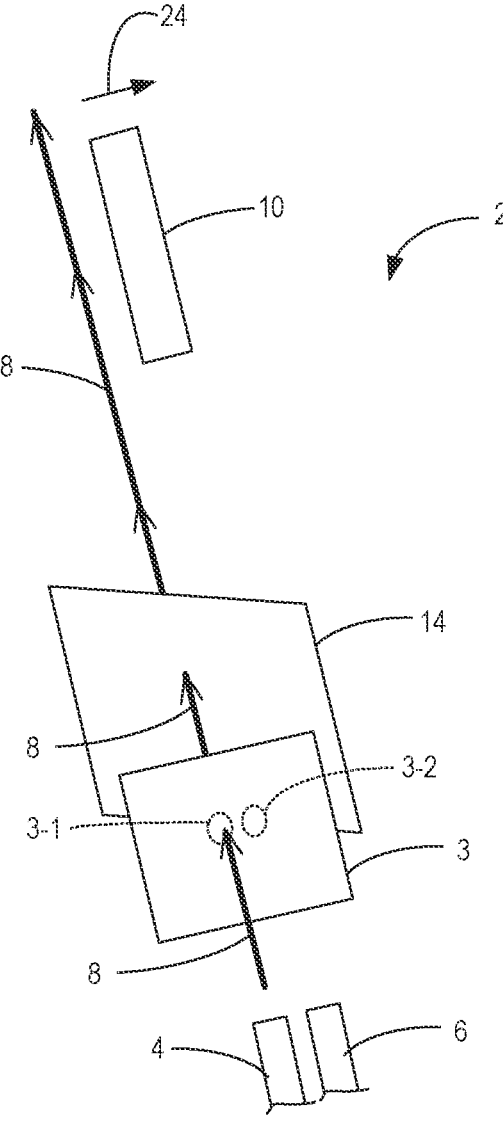
Figure 3A:
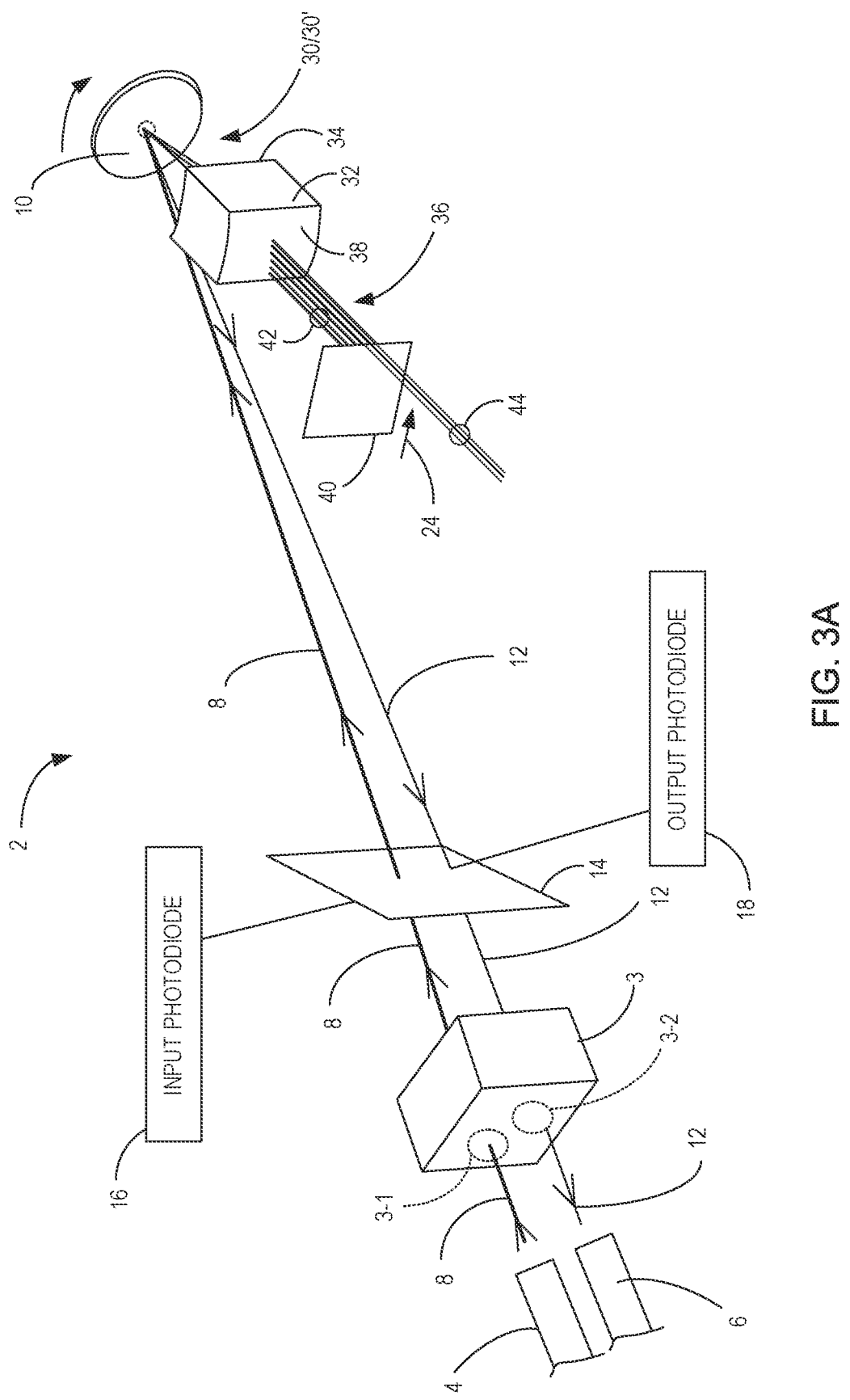
FIG. 3A is a perspective side view of another example VOA in accordance with the principles of the present disclosure including a lens means, a rotatable reflector or mirror, a cylindrical lens, and a reflector that is partially positioned in the path of parallel light beams output by the cylindrical lens.
Figure 3B:
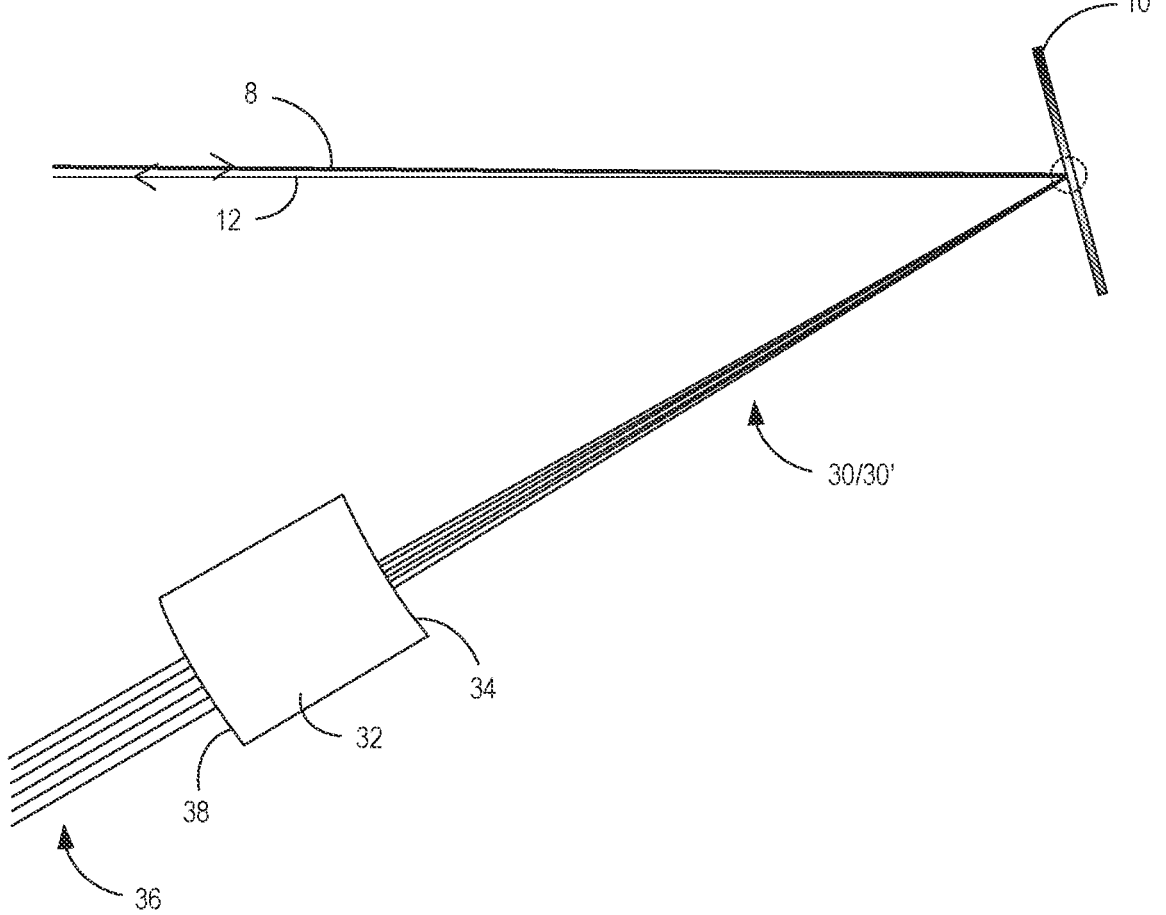
FIGS. 3B-3C are views showing how the rotating reflector or mirror of FIG. 3A reflects and spreads the input light beam input into an input face of the cylindrical lens which separates the spread input light beam into a plurality of parallel light beams that are output via an output face of the cylindrical lens to the reflector (FIG. 3C)
Figure 3C:
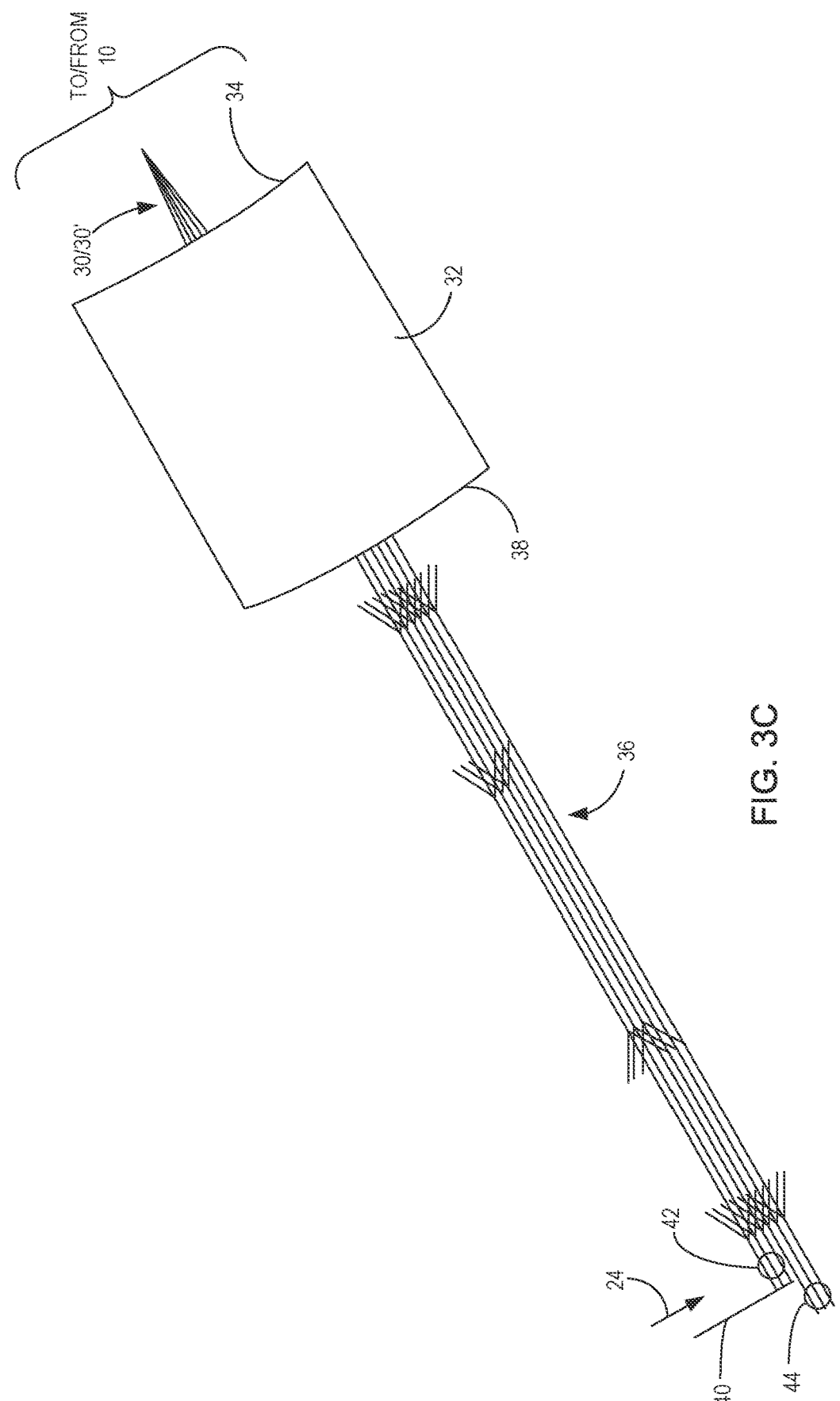
Figure 3D:
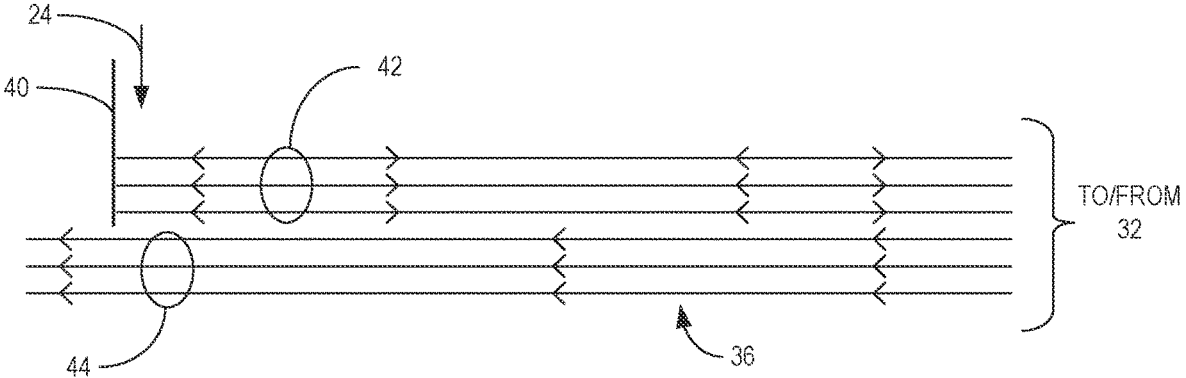
FIG. 3D is an isolated view of the reflector of FIGS. 3A and 3C shown positioned for reflecting a portion of the parallel beams of light output via the output face of the cylindrical lens back through the cylindrical lens and for passing another portion of the parallel beams of light output via the output face of the cylindrical lens.

With reference to FIGS. 2A-2C, another example variable optical attenuator (VOA) 2 in accordance with the principles of the present disclosure may comprise a lens means 3 optically coupled to input and output optical fibers 4 and 6, e.g., via a dual pigtail (shown e.g. in FIG. 1A). In an example, the lens means 3 may comprise input and output lenses 3-1 and 3-2 (shown in phantom) optically coupled to the input and output optical fibers 4 and 6, respectively. The lens means 3 may comprise a lens array that includes the input and output lenses 3-1 and 3-2.

An input light beam 8 exiting the input optical fiber 4 passes though the input lens 3-1 which focuses and passes the input light beam 8 toward a reflector or mirror 10. The input light beam 8 striking the surface of the reflector or mirror 10 is reflected thereby as an output light beam 12 which passes through the output lens 3-2 of the lens means 3 which focuses and passes the output light beam 12 to the output optical fiber 6.

In an example, starting from the state shown in FIG. 2A where the reflector or mirror 10 may be disposed or positioned completely in the path of the input light beam 8, whereupon the input light beam 8 received from the input optical fiber 6 is focused by the input lens 3-1 and is reflected by the reflector or mirror 10 as the output light beam 12 which is focused by the output lens 3-2 and provided to the output optical fiber 6.

If it is determined, either manually (e.g., empirically) or via the optional controller 22 from the values of electrical signals output by one or both of the optional photodiodes 16 and 18 (shown in FIG. 1A), that the output light beam 12 has too much or too great of a brightness or intensity, the reflector or mirror 10 may be moved, e.g., in the direction of arrow 24, partially out of the path of the input light beam 8 as shown in FIG. 2B. In response to this movement, the reflector or mirror 10 partially passes a portion 26 of the input light beam 8 via an edge of the reflector or mirror 10 and reflects the remainder of the input light beam 8 not passed via the edge of the reflector or mirror 10 to the output lens 3-2 and the output optical fiber 6 as the output light beam 12. In this example, the portion 26 of the input light beam 8 passed by the reflector or mirror 10 is not used.

For the purpose of illustration, in FIG. 2B the input light beam 8 prior to being partially passed and partially reflected by the reflector or mirror 10 is shown by a heavier line weight (indicative of the greater brightness or intensity of the input light beam 8 approaching the reflector or mirror 10) while the portion 26 of the input light beam 8 passed by reflector or mirror 10 and the portion of the input light beam 8 reflected by the reflector or mirror 10 as the output light beam 12 are shown by lighter line weights (indicative of a reduced brightness or intensity of the portion 26 of the input light beam 8 passed by the reflector or mirror 10 and the portion of the input light beam 8 reflected by the reflector or mirror 10 as the output light beam 12).

As can be seen, the brightness or intensity of the output light beam 12 may be controlled by selectively moving the reflector or mirror 10 as needed and/or desired to reflect as little or as much of the input light beam 8 to achieve a desired level of attenuation between the input and output light beams 8 and 12.

As shown in FIG. 2C, if desired, the reflector or mirror 10 may be moved entirely out of the path of the input light beam 8, such that the VOA 2 achieves complete attenuation of the input light beam 8 whereupon there is no output light beam 12.

With reference to FIGS. 3A-3D, another example variable optical attenuator (VOA) 2 in accordance with the principles of the present disclosure may comprise a lens means 3 optically coupled to input and output optical fibers 4 and 6, e.g., via a dual pigtail (shown e.g. in FIG. 1A). In an example, the lens means 3 may comprise input and output lenses 3-1 and 3-2 (shown in phantom) optically coupled to the input and output optical fibers 4 and 6, respectively. The lens means 3 may comprise a lens array that includes the input and output lenses 3-1 and 3-2.

An input light beam 8 exiting the input optical fiber 4 passes though the input lens 3-1 which focuses and passes the input light beam 8 toward a rotating reflector or mirror 10. The input light beam 8 impinging on the rotating reflector or mirror 10 is reflected thereby to a cylindrical lens 32. The rotating reflector or mirror 10 is configured to cause the input light beam 8 reflected thereby to diverge 30, e.g., in a cone shape, to the cylindrical lens 32 which separates the diverging 30 input light beam 8 received at different parts of an input face 34 of the cylindrical lens 32 into a plurality of parallel beams of light 36 that are output via an output face 38 of the cylindrical lens 32 to a reflector 40.

In an example, the reflector 40 may be positioned to reflect or return a first part or portion 42 of the parallel beams of light 36 output by the output face 38 of the cylindrical lens 32 back to the output face 38 of the cylindrical lens 32 and to pass a second part or portion 44 of the parallel beams of light 36 output by the output face 38 of the cylindrical lens 32. In this example, the second part or portion 44 of the parallel beams of light 36 output by the output face 38 of the cylindrical lens 32 and passed by the reflector or mirror 40 is not used.

The cylindrical lens 32 converges the first part or portion 42 of the parallel beams of light 36 reflected or returned by the reflector 40 to the output face 38 of the cylindrical lens 32. This converged first part or portion 42 is output by the cylindrical lens 32 as a converging light beam 30' to the rotating reflector or mirror 10 which reflects the converged light beam 30' impinging thereon as the output light beam 12 which is focused by the output lens 3-2 and provided or output to the output optical fiber 6.

If it is determined, either manually (e.g., empirically) or via the optional controller 22 from the values of electrical signals output by one or both of the optional photodiodes 16 and 18, that the output light beam 12 has too little brightness or intensity, the reflector 40 may be moved, in the direction of arrow 24, further into the path of the parallel beams of light 36, thereby allowing less of the parallel beams of light 36 to pass by the reflector 40 and more of the parallel beams of light 36 to be reflected by the reflector 40 back to the to the output face 38 of the cylindrical lens 32, thereby increasing the brightness or intensity of the output light beam 12.

On the other hand, if it is determined that the output light beam 12 has too much brightness or intensity, the reflector 40 may be moved, in the direction opposite arrow 24, further out of the path of the parallel beams of light 36, thereby allowing more of the parallel beams of light 36 to pass by the reflector 40 and less of the parallel beams of light 36 to be reflected by the reflector 40 back to the to the output face 38 of the cylindrical lens 32, thereby decreasing the brightness or intensity of the output light beam 12.

While not specifically shown, it is also envisioned that the reflector 40 may be moved completely into or out of the path of the parallel beams of light 36, thereby respectively completely reflecting the parallel beams of light 36 back to the output face 38 of the cylindrical lens 32, whereupon there is little or no attenuation of the input light beam 8, or completely allowing the parallel beams of light 36 to pass without reflection, whereupon there is complete attenuation of the input light beam 8 and no output light beam 12.

In an example, the rotating mirror 10 may be a Micro-Electro-Mechanical System (MEMS) mirror that may be configured and rotated at a speed as necessary and/or desired to reflect the input light beam 8 toward the cylindrical lens 32 while causing the input light beam 8 reflected thereby to diverge, e.g., in a cone shape, toward the input face 34 of the cylindrical lens 32. The rotating mirror 10 may also be configured and rotated at a speed as necessary and/or desired to reflect the converging light beam 30' returned from the input face 34 of the cylindrical lens 32 as the output light beam 12 to the output lens 3-2 which focuses and provides or outputs the output light beam 12 to the output optical fiber 6. Where the input and output light beams 8 and 12 converge on the rotating mirror 10 in the figures is strictly for the purpose of illustration and is not to be construed in a limiting sense.

Figure 4A:
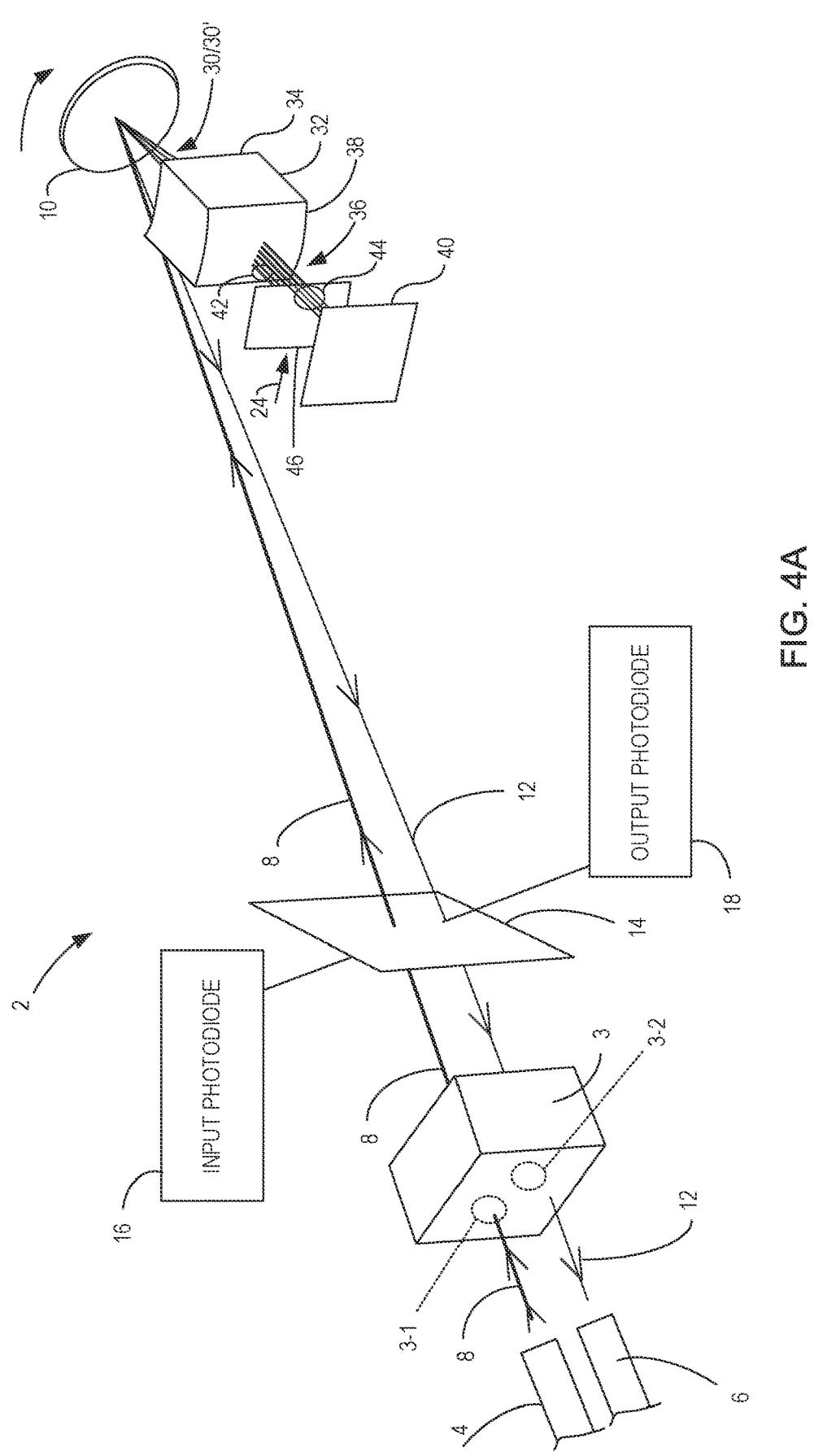
FIG. 4A is a perspective side view of another example VOA in accordance with the principles of the present disclosure including a lens means, a rotatable reflector or mirror, a cylindrical lens, a shutter or block positioned to pass a portion of parallel light beams output via an output face of the cylindrical lens and to block another portion of the parallel light beams output via an output face of the cylindrical lens, and a reflector positioned to reflect the portion of parallel light beams passed by the shutter or block.
Figure 4B:
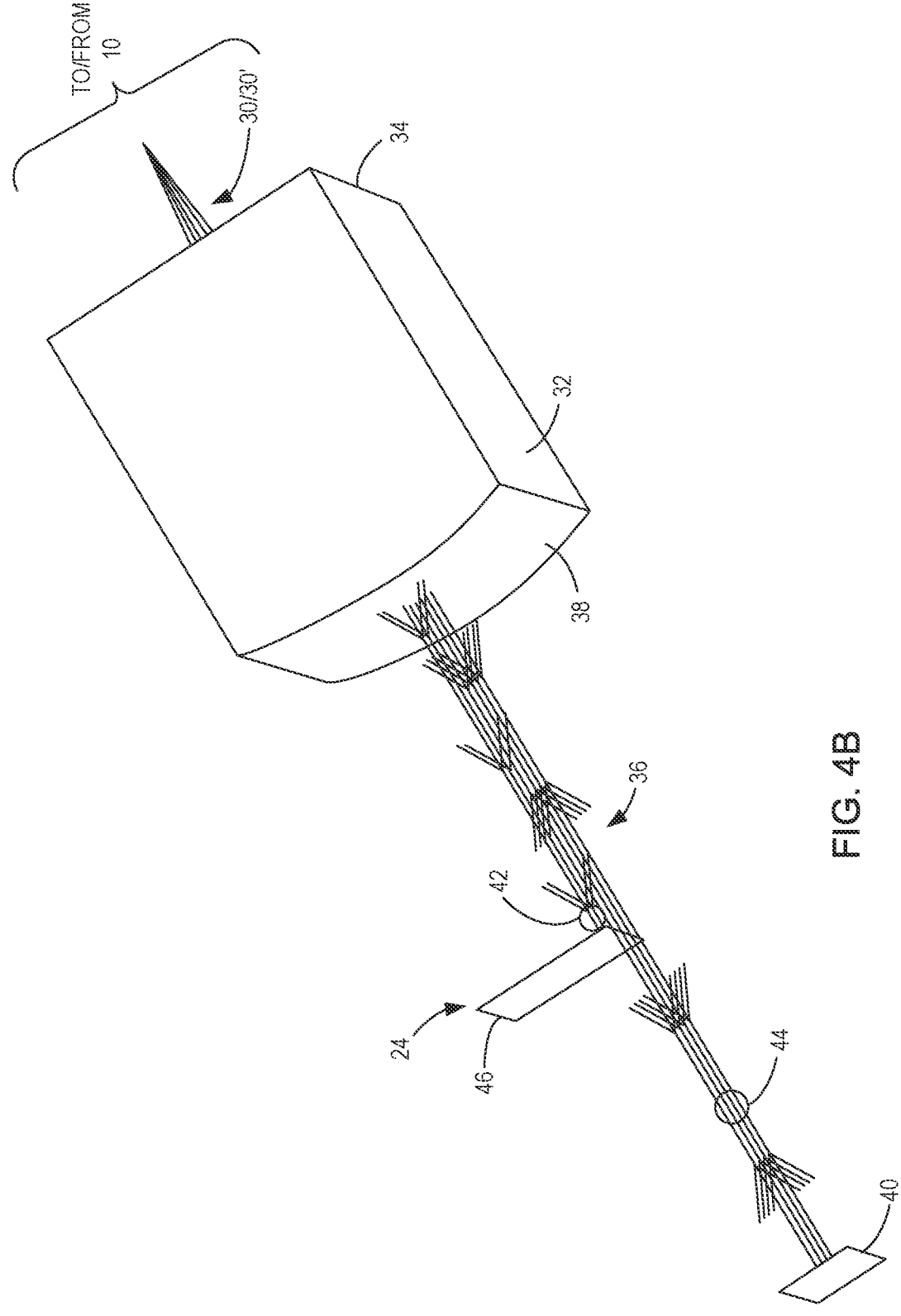
FIG. 4B is an isolated view of the cylindrical lens, shutter or block and reflector of FIG. 4A.
Figure 4C:
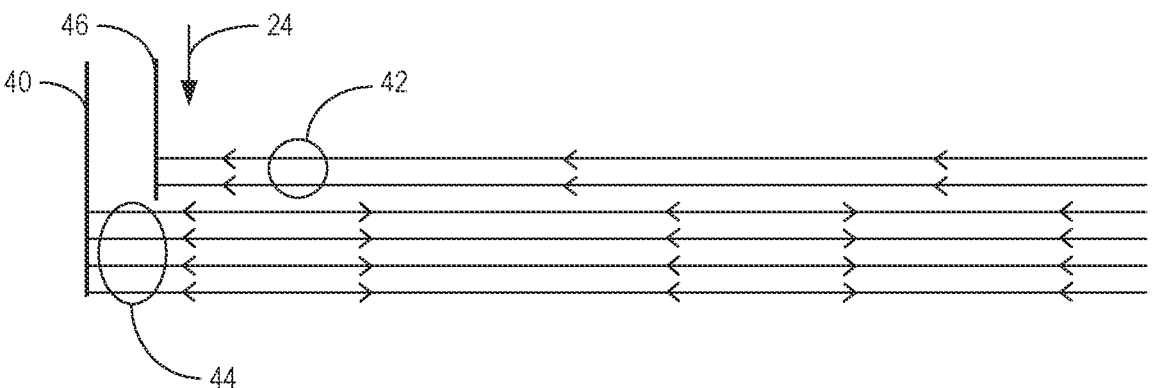
FIG. 4C is an isolated view of the shutter or block and reflector of FIGS. 4A and 4B showing the shutter or block positioned for passing the portion of the parallel beams of light output via the output face of the cylindrical lens to the reflector for reflection back through the cylindrical lens and for blocking the other portion of the parallel beams of light output via the output face of the cylindrical lens.

With reference to FIGS. 4A-4C, another example variable optical attenuator (VOA) 2 in accordance with the principles of the present disclosure may comprise a lens means 3 optically coupled to input and output optical fibers 4 and 6, e.g., via a dual pigtail (shown e.g. in FIG. 1A). In an example, the lens means 3 may comprise input and output lenses 3-1 and 3-2 (shown in phantom) optically coupled to the input and output optical fibers 4 and 6, respectively. The lens means 3 may comprise a lens array that includes the input and output lenses 3-1 and 3-2.

An input light beam 8 exiting the input optical fiber 4 passes though the input lens 3-1 which focuses and passes the input light beam 8 toward a rotating reflector or mirror 10. The input light beam 8 impinging on the rotating reflector or mirror 10 is reflected thereby to a cylindrical lens 32. The rotating reflector or mirror 10 is configured to cause the input light beam 8 reflected thereby to diverge 30, e.g., in a cone shape, to the cylindrical lens 32 which separates the diverging 30 input light beam 8 received at different parts of an input face 34 of the cylindrical lens 32 into a plurality of parallel beams of light 36 that are output via an output face 38 of the cylindrical lens 32 toward a reflector 40 which, in this example, is stationary and positioned fully in the path of the plurality of parallel beams of light 36 that are output via the output face 38 of the cylindrical lens 32.

Disposed between the output face 38 of the cylindrical lens 32 and the reflector 40 is a moveable shutter or block 46 that may be moveable, at least partially, into and/or out of the path of the plurality of parallel beams of light 36. In an example, the shutter or block 46 may be positioned to block or obstruct a first part or portion 42 of the parallel beams of light 36 output by the output face 38 of the cylindrical lens 32 from reaching the reflector 40 and to pass a second part or portion 44 of the parallel beams of light 36 output by the output face 38 of the cylindrical lens 32 to the reflector 40. The reflector 40 reflects the second part or portion 44 of the parallel beams of light 36 back to the output face 38 of the cylindrical lens 32. In this example, the first part or portion 42 of the parallel beams of light 36 blocked or obstructed by the shutter or block 46 is absorbed thereby, whereupon little or none of the absorbed light is reflected, and is not used.

The cylindrical lens 32 converges the second part or portion 44 of the parallel beams of light 36 reflected or returned by the reflector 40 to the output face 38 of the cylindrical lens 32. This converged second part or portion 44 is output by the cylindrical lens 32 as a converging light beam 30' to the rotating reflector or mirror 10 which reflects the converged light beam 30' impinging thereon as the output light beam 12 which is focused by the output lens 3-2 and provided or output to the output optical fiber 6.

If it is determined, either manually (e.g., empirically) or via the optional controller 22 from the values of electrical signals output by one or both of the optional photodiodes 16 and 18, that the output light beam 12 has too little brightness or intensity, the shutter or block 46 may be moved, in a direction opposite arrow 24, further out of the path of the parallel beams of light 36. This movement allows more of the parallel beams of light 36 to pass by the shutter or block 46 for reflection by the reflector 40 back to the to the output face 38 of the cylindrical lens 32, thereby increasing the brightness or intensity of the output light beam 12.

On the other hand, if it is determined that the output light beam 12 has too much brightness or intensity, the shutter or block 46 may be moved, in the direction of arrow 24, further into the path of the parallel beams of light 36, thereby blocking more of the parallel beams of light 36 from reaching and being reflected by the reflector 40 back to the to the output face 38 of the cylindrical lens 32, thereby decreasing the brightness or intensity of the output light beam 12.

While not specifically shown, it is also envisioned that the shutter or block 46 may be moved completely into or out of the path of the parallel beams of light 36, thereby respectively adsorbing all of the parallel beams of light 36, whereupon there is complete or substantially complete attenuation of the input light beam 8 and no output light beam 12, or completely allowing the parallel beams of light 36 to pass to the reflector 40 without any adsorption by the shutter or block 46, whereupon there is little no attenuation of the input light beam 8.

In an example, the rotating mirror 10 may be a Micro-Electro-Mechanical System (MEMS) mirror that may be configured and rotated at a speed as necessary and/or desired to reflect the input light beam 8 toward the cylindrical lens 32 while causing the input light beam 8 reflected thereby to diverge, e.g., in a cone shape, toward the input face 34 of the cylindrical lens 32. The rotating mirror 10 may also be configured and rotated at a speed as necessary and/or desired to reflect the converging light beam 30' returned from the input face 34 of the cylindrical lens 32 as the output light beam 12 to the output lens 3-2 which focuses and provides or outputs the output light beam 12 to the output optical fiber 6. Where the input and output light beams 8 and 12 converge on the rotating mirror 10 in the figures is strictly for the purpose of illustration and is not to be construed in a limiting sense.

Other non-limiting examples or aspects of this disclosure are set forth in the following illustrative and exemplary numbered clauses:

Clause 1: A variable optical attenuator (VOA) comprises a lens means for receiving an input light beam and for outputting an output light beam; a reflector or mirror for reflecting the input light beam as the output light beam; and a moveable element that is movable, at least partially, into or out of a path of at least one of the input light beam and the output light beam between the lens means and the reflector or mirror for blocking at least a portion of the at least one of the input light beam and the output light beam.

Clause 2: The VOA of clause 1 may include a splitter in the paths of the input and output light beams between the lens means and the moveable element, wherein the splitter may be operative for reflecting portions of the input and output light beams, for passing another portion of the input light beam to the reflector or mirror, and for passing another portion of the output light beam to the lens means. An input photodiode may be positioned and operative to receive and convert the reflected portion of the input light beam into a input electrical signal. An output photodiode may be positioned and operative to receive and convert the reflected portion of the output light beam into an output electrical signal.

Clause 3: The VOA of clause 1 or 2 may include a controller that is programed or configured for controlling the movement of the moveable element.

Clause 4: The VOA of any one of clauses 1-3, wherein the moveable element may comprise a shutter.

Clause 5: A method of variably optically attenuating a light beam comprises: (a) passing an input light beam through a first lens; (b) reflecting, by a reflector or mirror, at least a portion of the input light beam of step (a) as an output light beam; (c) positioning a moveable element at least partially in a path of at least one of the input light beam and the output light beam; and (d) outputting at least a portion of the output light beam through a second lens.

Clause 6: A variable optical attenuator (VOA) comprises a lens means for receiving an input light beam and for outputting an output light beam; and a reflector or mirror for reflecting the input light beam as the output light beam, wherein the reflector or mirror is movable, at least partially, into or out of a path of the input light beam.

Clause 7: The VOA of clause 6 may include a splitter in the paths of the input and output light beams between the lens means and the moveable element, wherein the splitter may be operative for reflecting portions of the input and output light beams, for passing another portion of the input light beam to the reflector or mirror, and for passing another portion of the output light beam to the lens means. An input photodiode may be positioned and operative to receive and convert the reflected portion of the input light beam into a input electrical signal. An output photodiode may be positioned and operative to receive and convert the reflected portion of the output light beam into an output electrical signal.

Clause 8: The VOA of clause 6 or 7 may include a controller that is programed or configured for controlling the movement of the reflector or mirror.

Clause 9: A method of variably optically attenuating a light beam comprising; (a) passing an input light beam through a first lens; (b) reflecting, by a reflector or mirror, at least a portion of the input light beam of step (a) as an output light beam; (c) moving the reflector or mirror at least partially into or out of a path of the input light beam; and (d) outputting at least a portion of the output light beam through a second lens.

Clause 10: A variable optical attenuator (VOA) comprises: a lens means for receiving an input light beam and for outputting an output light beam; a rotatable mirror positioned and operative, when rotating, for reflecting the input light beam received from the lens means to different parts of an input face of a cylindrical lens which causes the input light beam received at the different parts of the input face of the cylindrical lens to be output as a plurality of parallel beams of light via an output face of the cylindrical lens; and a reflector positioned for reflecting at least a portion of the parallel beams of light output via the output face of the cylindrical lens back through the cylindrical lens to the rotatable mirror which reflects the light received from the cylindrical lens as the output light beam.

Clause 11: The VOA of clause 10, wherein the reflector may be positioned for passing another portion of the parallel beams of light output via the output face of the cylindrical lens.

Clause 12: The VOA of clause 10 or 11, wherein the reflector may be moveable into or out of a path of the parallel beams of light output via the output face of the cylindrical lens Clause 13: The VOA of any one of clauses 10-12 may include a shutter or block between the output face of the cylindrical lens and the reflector. The shutter or block may be positioned to pass the at least portion of the parallel beams of light to the reflector and to avoid or prevent another portion of the parallel beams of light output via the output face of the cylindrical lens from reaching the reflector.

Clause 14: The VOA of any one of clauses 10-13, wherein the shutter or block may be moveable into or out of a path of the parallel beams of light output via the output face of the cylindrical lens.

Clause 15: The VOA of any one of clauses 10-14 may include a controller that that is programed or configured for controlling a position of the shutter or block at least partially in the path of the parallel beams of light that are output via the output face of the cylindrical lens.

Clause 16: The VOA of any one of clauses 10-15 may include a splitter in the paths of the input and output light beams between the lens means and the rotatable mirror. The splitter may be operative for reflecting portions of the input and output light beams, for passing another portion of the input light beam to the rotatable mirror, and for passing another portion of the output light beam to the lens means. An input photodiode may be positioned and operative to receive and convert the reflected portion of the input light beam into a input electrical signal. An output photodiode may be positioned and operative to receive and convert the reflected portion of the output light beam into an output electrical signal.

Clause 17: The VOA of any one of clauses 10-16 may include a controller that is programed or configured for controlling a position of the reflector at least partially in the path of the parallel beams of light that are output via the output face of the cylindrical lens.

Clause 18: A method of variably optically attenuating a light beam comprises: (a) passing an input light beam through a first lens; (b) reflecting, by a rotating mirror, at least a portion of the input light beam of step (a) to a reflector via a cylindrical lens which separates the input light beam received at the different parts of an input face of the cylindrical lens into a plurality of parallel beams of light that are output via an output face of the cylindrical lens to the reflector; (c) reflecting, by the reflector, at least a portion of the parallel beams of light output via the output face of the cylindrical lens back through the cylindrical lens to the rotating mirror which reflects the light received from the cylindrical lens as the output light beam through a second lens.

Clause 19: The method of clause 18 may include passing, by the reflector, another portion of the plurality of the parallel beams of light output via the output face of the cylindrical lens.

Clause 20: The method of clause 18 or 19 may include blocking, by a shutter or block, another portion of the plurality of parallel beams of light output via the output face of the cylindrical lens from reaching the reflector.

Although this disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A variable optical attenuator (VOA) comprising:
a lens means for receiving an input light beam and for outputting an output light beam;
a rotatable mirror positioned and operative, when rotating, for reflecting the input light beam received from the lens means to different parts of an input face of a cylindrical lens which causes the input light beam received at the different parts of the input face of the cylindrical lens to be output as a plurality of parallel beams of light via an output face of the cylindrical lens; and
a reflector positioned for reflecting at least a portion of the parallel beams of light output via the output face of the cylindrical lens back through the cylindrical lens to the rotatable mirror which reflects the light received from the cylindrical lens as the output light beam.

2. The VOA of claim 1, wherein the reflector is positioned for passing another portion of the parallel beams of light output via the output face of the cylindrical lens.

3. The VOA of claim 1, wherein the reflector is moveable into or out of a path of the parallel beams of light output via the output face of the cylindrical lens.

4. The VOA of claim 1, further comprising a shutter or block between the output face of the cylindrical lens and the reflector, wherein the shutter or block is positioned to pass the at least portion of the parallel beams of light to the reflector and to avoid or prevent another portion of the parallel beams of light output via the output face of the cylindrical lens from reaching the reflector.

5. The VOA of claim 4, wherein the shutter or block is moveable into or out of a path of the parallel beams of light output via the output face of the cylindrical lens.

6. The VOA of claim 5, further comprising a controller that that is programed or configured for controlling a position of the shutter or block at least partially in the path of the parallel beams of light that are output via the output face of the cylindrical lens.

7. The VOA of claim 1, further comprising:

a splitter in the paths of the input and output light beams between the lens means and the rotatable mirror, the splitter operative for reflecting portions of the input and output light beams, for passing another portion of the input light beam to the rotatable mirror, and for passing another portion of the output light beam to the lens means;

an input photodiode positioned and operative to receive and convert the reflected portion of the input light beam into a input electrical signal; and an output photodiode positioned and operative to receive and convert the reflected portion of the output light beam into an output electrical signal.

8. The VOA of claim 1, further comprising a controller that is programed or configured for controlling a position of the reflector at least partially in the path of the parallel beams of light that are output via the output face of the cylindrical lens.

9. A method of variably optically attenuating a light beam comprising:

(a) passing an input light beam through a first lens;

(b) reflecting, by a rotating mirror, at least a portion of the input light beam of step (a) to a reflector via a cylindrical lens which separates the input light beam received at the different parts of an input face of the cylindrical lens into a plurality of parallel beams of light that are output via an output face of the cylindrical lens to the reflector;

(c) reflecting, by the reflector, at least a portion of the parallel beams of light output via the output face of the cylindrical lens back through the cylindrical lens to the rotating mirror which reflects the light received from the cylindrical lens as the output light beam through a second lens.

10. The method of claim 9, further comprising passing, by the reflector, another portion of the plurality of the parallel beams of light output via the output face of the cylindrical lens.

11. The method of claim 9, further comprising blocking, by a shutter or block, another portion of the plurality of parallel beams of light output via the output face of the cylindrical lens from reaching the reflector.

* * * * *